United States Patent [19]
Anzel

[11] Patent Number: 5,810,295
[45] Date of Patent: Sep. 22, 1998

[54] METHOD AND APPARATUS FOR A SATELLITE STATION KEEPING

[75] Inventor: Bernard M. Anzel, El Segundo, Calif.

[73] Assignee: Hughes Electronics Corporation, El Segundo, Calif.

[21] Appl. No.: 678,621

[22] Filed: Jul. 10, 1996

[51] Int. Cl.$^6$ .................................................. B64G 1/10
[52] U.S. Cl. ...................... 244/158 R; 244/166; 244/169
[58] Field of Search .............................. 244/158 R, 164, 244/165, 169, 170, 171, 172

[56] References Cited

U.S. PATENT DOCUMENTS

| | | | |
|---|---|---|---|
| 4,767,084 | 8/1988 | Chan et al. .............................. | 244/164 |
| 5,020,746 | 6/1991 | Anzel . | |
| 5,349,532 | 9/1994 | Tilley et al. ............................ | 244/164 |
| 5,443,231 | 8/1995 | Anzel . | |

*Primary Examiner*—Galen L. Barefoot
*Attorney, Agent, or Firm*—Terje Gudmestad; Elizabeth E. Leitereg; Michael W. Sales

[57] ABSTRACT

A method and apparatus for satellite station keeping is disclosed in which six thrusters are mounted on the anti-nadir face of a satellite with their direction of thrust passing through the center of mass (CM) of the satellite. The thrust lines of the north trio of thrusters and the south trio of thrusters make an angle θ with the satellite north-south axis in a northern and southern direction, respectively. The four outer thrusters are laterally separated and slewed by an angle α about the north-south axis. Each outer thruster produces three components of ΔV, i.e. normal, tangential and radial (toward the Earth), thereby providing complete control of the three orbit vectors, inclination, eccentricity and mean motion. The north and south center thrusters are positioned in the Local-Vertical North-South plane and produce only normal and radial ΔV components, providing control for momentum dumping and, in the event of failure, inclination control. In the event of a thruster failure where one of the pairs of thrusters is shut down, four thrusters remain to maintain station keeping.

9 Claims, 3 Drawing Sheets

METHOD AND APPARATUS FOR A SATELLITE STATION KEEPING

TECHNICAL FIELD

This invention relates to satellite station keeping and more particularly to a method and apparatus for maintaining the satellite in a stationary orbit through the simultaneous control of tangential, radial and normal acceleration components of thrust while providing for continued operation in the case of thruster/thruster pair failure.

BACKGROUND ART

Synchronous satellites orbit the Earth with the same revolution rate as that of the Earth. Accordingly, the satellite appears above a fixed point on the Earth. Hence, synchronous satellites are often referred to as geostationary satellites and operate within a stationary orbit. Synchronous satellites are useful for many applications including weather and communication applications.

It is generally well known in the art that various forces act on synchronous satellites to move the satellite out of stationary orbit. These forces are due to several sources including the gravitational effects of the sun and moon, the elliptical shape of the Earth and solar radiation pressure. To counter these forces, synchronous satellites are equipped with propulsion systems that are fired at intervals in order to maintain station in a desired orbit. This requires control of the inclination, eccentricity and mean motion of the satellite. Inclination is the north-south position of the satellite relative to the Earth's equator. Eccentricity is the measure of the non-circularity of the satellite orbit. That is, the measure of the variation of the distance the satellite is from the Earth as the Earth and satellite rotate. Finally, mean motion is the average position of the satellite in an east-west direction relative to a sub-satellite point on the Earth. For a more detailed discussion see Controlling a Stationary Orbit Using Electric Propulsion by Bernard M. Anzel, presented to the 1988 International Electric Propulsion Conference in West Germany.

Station keeping was first achieved with a spin-stabilized communication satellite launched in 1964. Current satellites are either spin-stabilized or three-axis stabilized satellites. Spin-stabilized satellites use the gyroscopic effect of the satellite spinning to help maintain the satellite orbit. For certain applications, the size of the satellite militates in favor of a three-axis stabilization scheme. Current three-axis stabilized satellites use separate sets of thrusters to control north-south and east-west motions. The north thrusters produce the required north-south change in satellite velocity, or $\Delta V$, to control orbit inclination. The east thrusters and west thrusters produce the required combined east-west $\Delta V$ to control orbit mean motion and eccentricity. For each of these three maneuvers, thrusters are fired in pairs to cancel torques since the thrust directions do not pass through the satellite center of mass. Furthermore, there are three separate maneuvers performed at different times as required by the physics of the perturbations. The frequency of these maneuvers are typically every 14 days for both the north-south maneuver and the pair of east-west maneuvers (east and west firings occur approximately ½ orbit apart or about 12 hours) when using 5 pound thrusters with liquid propulsion.

In U.S. Pat. No. 5,020,746, assigned to the assignee of the present invention and incorporated herein by reference, station keeping of a three-axis stabilized satellite is provided using only two thrusters mounted on the anti-nadir face of the satellite. A north thruster is canted away from the face at an angle $\theta$ from the north-south axis of the satellite in a northern direction and a south thruster is canted away from the face at an angle $\theta$ from the north-south axis in a southern direction. Both thrusters are also translated to the east or west along an east-west axis of the satellite and swiveled at variable angles $\alpha_1$ and $\alpha_2$, respectively. The patent discloses a technique for determining the angles $\alpha_1$ and $\alpha_2$ and the firing positions of the thrusters in order to maintain the satellite in a stationary orbit.

A two thruster system such as disclosed in the aforementioned patent is constrained in several respects. In order to control east-west motion as well as north-south motion, the thruster mounting locations must be customized for the particular satellite station location. Notwithstanding this customization only a partial control of eccentricity is achieved. Also, in order to counter the eccentricity buildup resulting from a failure of one of the two thrusters, a back-up thruster must be provided.

In U.S. Pat. No. 5,443,231, assigned to the assignee of the present invention and incorporated herein by reference, four thrusters are mounted on the anti-nadir face of a three-axis stabilized satellite with their direction of thrust passing through the center of mass of the satellite. The thrust lines of the north pair of thrusters and the south pair of thrusters make an angle $\theta$, of for example 36°, with the satellite north-south axis in a northern and southern direction, respectively. The thrusters are laterally separated and slewed by an angle $\alpha$, of for example 10°, about the north-south axis. The four thrusters provide complete control of the three orbit vectors, namely, inclination, eccentricity and mean motion. Each thruster produces three components of $\Delta V$, i.e. normal, tangential and radial (toward the Earth), since their lines of thrust are directed through the satellite center of mass. With the configuration provided by the present invention, each of the north pair of thrusters is fired near the orbit ascending node and each of the south pair of thruster is fired near the orbit descending node. Each thruster firing produces tangential and radial $\Delta V$ components, which control east-west motion, simultaneously with the normal $\Delta V$ component which controls north-south motion.

In the event of failure of a thruster, the corresponding diagonally located thruster may be shut down and a third and fourth simultaneous firing of the two remaining thrusters are performed midway between the ascending and descending nodes. These firings produce equal $\Delta V$ components, resulting in normal and tangential $\Delta V$ cancellations but additive radial components. The radial components produced by the third and fourth firings cancel the eccentricity error created by the firings at the ascending and descending node and the eccentricity change caused by the action of solar pressure.

The problem inherent in the four thruster method is that additional thruster firings at variable points around the orbit of the satellite are required, in case of failure, using the same thrusters. Such additional firings require that the thrusters be qualified for increased total firing durations incurring costly qualification testing which may or may not be possible.

SUMMARY OF THE INVENTION

The present invention provides a method and apparatus for synchronous satellite station keeping utilizing six ion thrusters, three north (ABC) and three south (DEF), mounted on the anti-nadir face of a 3-axis stabilized satellite, all of the thrusters ABCDEF having their thrust axes directed through the center of mass (CM) of the satellite having the East-West axis, North-South axis, and Local Vertical axis defined as the X,Y,Z axes, respectively.

Thrusters B,E are positioned in the Y,Z plane such that they only develop normal and radial ΔV components during firing. Thrusters A,C,D,F are positioned as described in the above-referenced U.S. Pat. No. 5,443,231 so that each produces all three orthoginal ΔV components; i.e., normal, radial, and tangential.

All the thrusters are gimbaled, so that they can be pointed away from the CM of the satellite if necessary to produce torques as well as accelerations when fired. These torques can be used to dump momentum which has accumulated by virtue of disturbances on the satellite. While thrusters A,C, D,F perform optimum on-orbit control as described in U.S. Pat. No. 5,443,231 and remain pointed through the CM, thrusters B,E may be gimbaled for the purpose of dumping momentum. The accelerations produced by their thruster firings will be timed to influence only the orbit inclination in a pre-selected manner.

Each opposing pair of thrusters AF,BE,CD are connected as a power propulsion unit (PPU) Thus, a PPU failure removes that thruster pair from operation. Failure of a single thruster is treated as the failure of the PPU containing the failed thruster such that neither thruster of the pair is used. This failure of a single thruster reduces the system from six thrusters to four thrusters. The three failure situations are (1) B,E failure, (2) A,F failure, and (3) C,D failure.

In case (1), failure of thrusters B or E results in the four thruster configuration, A,C,D,F described in U.S. Pat. No. 5,443,231 remaining. Operation of the system in this case differs from optimum in that a pair of diagonal thrusters are fired twice per orbit for one-half year and then switching to the alternate pair to be fired twice per orbit for the remaining one-half year.

In Case (2), failure of the A or F thrusters will require the C and D thrusters to only control drift and eccentricity throughout the year. In this case, thrusters B and E become responsible for inclination control and simultaneous momentum dumping using the gimbal angles.

In Case (3), failure of the C or D thrusters will require the A and F thrusters to control only the drift and eccentricity throughout the year. As in case (2), thrusters B and E will be used for inclination control and simultaneous momentum dumping using the gimbal angles.

Thus, the present invention overcomes the deficiency of the prior art in the event of a thruster/thruster pair failure, by decreasing the average number of firings per thruster to once per orbit. This in turn reduces the amount of expensive testing required to qualify the satellite thrusters.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
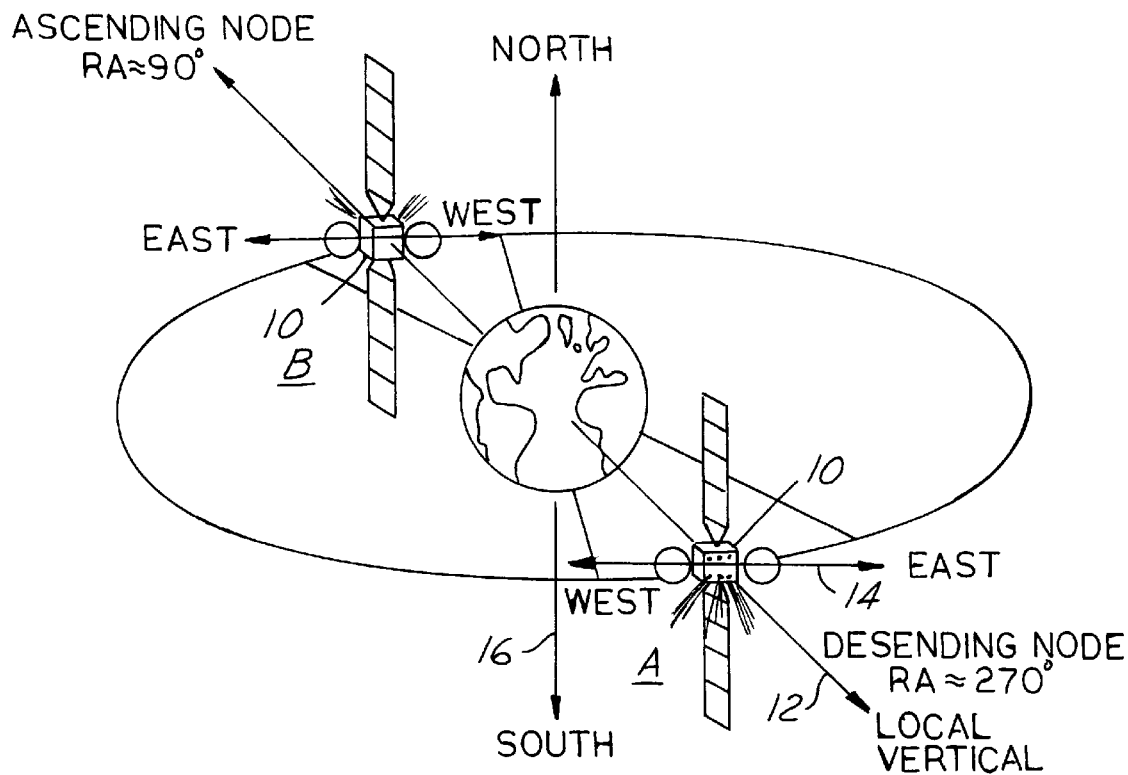
FIG. 1 shows a three-axis stabilized satellite in a stationary orbit about the Earth in two different positions to illustrate nominal (no failure) satellite station keeping of the present invention.

Referring now to the drawings and initially to FIG. 1, a three-axis stabilized satellite 10 is shown in a stationary orbit about the Earth. A set of local coordinates for the satellite 10 is defined by a local vertical (Z) axis 12, by an east-west (X) axis 14 and a north-south (Y) axis 16. The origin of the coordinates is the center of mass (CM) of the satellite 10. The local vertical 12, as shown in FIG. 1, is the line through the Earth and satellite 10 which represents the nadir and anti-nadir directions. The nadir direction is the direction toward the Earth, and the anti-nadir direction is the direction away from the Earth. FIG. 1 shows the satellite 10 in a first position A and a second position B to illustrate the location where the thruster firings take place. The burn arcs of the thrusters are shown in FIG. 1.

Figure 2:
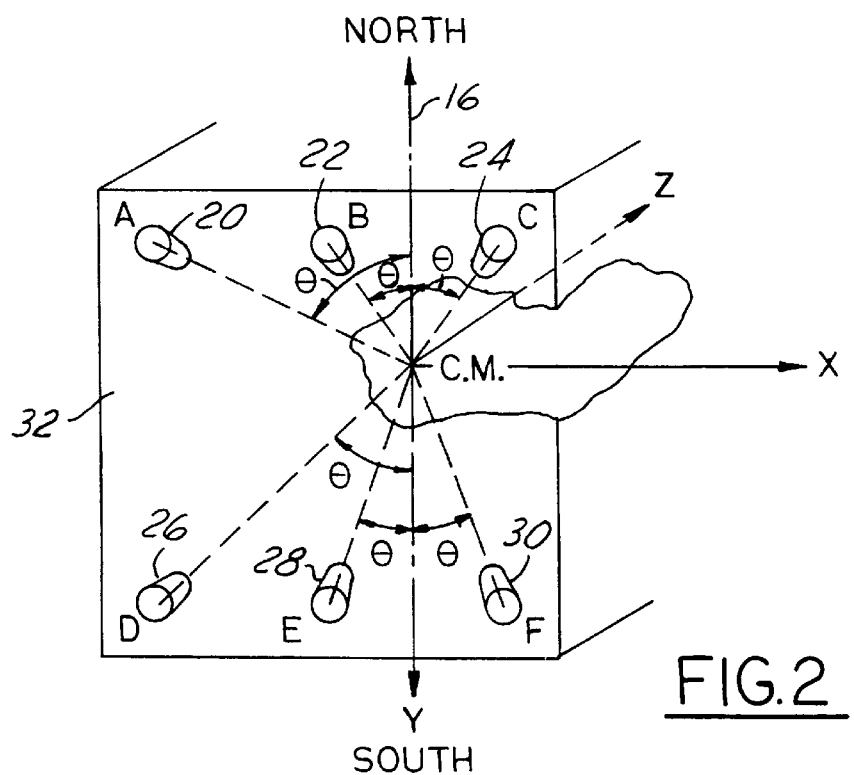
FIG. 2 shows a simplified 3-dimensional view of a three-axis satellite employing the six thruster system of the present invention.

Referring now to FIG. 2, six thrusters 20, 22, 24, 26, 28, and 30 are mounted on the anti-nadir face 32 of the satellite 10. The six thrusters are canted away from the anti-nadir face 32 by an angle θ so that the thrust lines pass through the satellite 10 center of mass. The north thruster trio 20, 22 and 24 are preferably mounted as close to the north end of the face 32 as is structurally possible. Likewise, the is south thruster trio 26, 28 and 30 are mounted as close to the south end of the face 32 as is structurally possible. This mounting will minimize the cant angles of each pair and therefore minimize the cosine loss. The cosine loss is a geometric inefficiency in that for each unit of ΔV which a thruster produces, a smaller amount (equal to the cosine of the cant angle) appears in the north-south direction. The thrust lines of the north thrusters 20,22,24 and the south thrusters 26, 28 and 30 make the angle θ, of for example 36°, with the north-south axis 16 in a northern and southern direction, respectively.

For convenience in identification of the thrusters herein, they can be referred to as follows: the northwest (20), north center (22) and northeast (24) thrusters forming the "north" set of thrusters and the southwest (26), south center (28) and southeast (30) thrusters forming the "south" set of thrusters.

Figure 3:
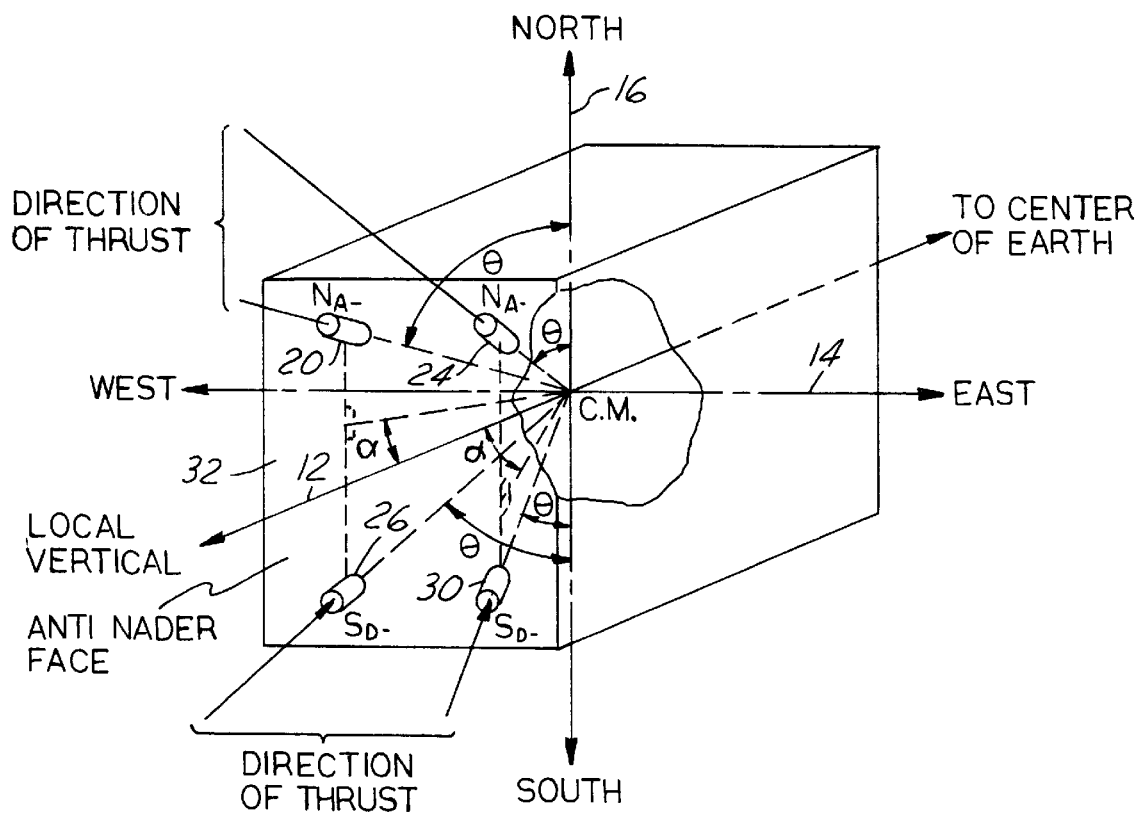
FIG. 3 shows a simplified 3-dimensional view of a three-axis satellite illustrating the placement of the four off-set thrusters used in the present invention.

In addition to the cant angle θ away from the anti-nadir face, the north and south outer thrusters 20, 24, 26 and 30, respectively, are also laterally separated and slewed by an angle α about the north-south axis 16. This is shown in FIG. 3. The slew angle must be large enough to effectively control the orbit eccentricity. The slew angles are determined from the tangential ΔV requirements imposed by the maximum solar force to satellite mass ratio to be encountered during on-station life. This then determines the horizontal separation for both the north and south thruster pairs along the anti-nadir face. A slew angle α approximately 10°–12° is appropriate.

Due to small changes in the center of mass of the satellite over time, both the slew angle α and the cant angle θ may need to be changed. This angle modification may be accomplished by a conventional gimble and servo mechanism (not shown). The six thrusters 20, 22, 24, 26, 28 and 30 provide complete control of the three orbit vectors, namely, inclination, eccentricity and mean motion as well as momentum dumping.

The four outer thrusters 20, 24, 26 and 30, which are also referred to in U.S. Pat. No. 5,443,231 as NA+,NA−,SD+, and SD−, respectively, produce three components of ΔV, i.e.

normal, tangential and radial, since their lines of thrust are directed through the satellite center of mass. The radial component is directed towards the Earth.

The north and south center thrusters 22,28 lie in and provide thrust only in the Y,Z plane. Therefore they develop normal and radial ΔV components only.

All of the thrusters 20, 22, 24, 26, 28 and 30 are gimbaled, so that they can be pointed away from the satellite 10 center of mass (CM) if necessary to produce torques, in addition to accelerations when fired. These torques can be used to dump momentum which has accumulated because of disturbances on the satellite 10. While the north and south outer thrusters 20, 24, 26 and 30 perform optimum on-orbit control (often synonymous with station keeping) as described in the referenced U.S. Pat. No. 5,443,231, they remain pointed through the CM. However, the north and south center thrusters 22,28 are also gimbaled to an orientation to produce a momentum dumping torque. In this new position, the thrust of thrusters is directed away from the CM of satellite 10. The accelerations produced by the momentum dump firings of thrusters 22,28 are timed to influence only the orbit inclination in a pre-selected manner.

Each opposing pair of thrusters, i.e. 20–30, 22–28, and 24–26, is connected as a power propulsion unit (PPU) such that failure of one thruster removes the PPU pair from operation. Thus, a single thruster failure reduces the system from six to four thrusters in a particular manner. There are three failure situations: (1) failure of thruster 22 or 28 or both 22,28; (2) failure of thrusters 20 or 30 or both; or (3) failure of thrusters 24 or 26 or both.

For nominal (no failure) operation, referring again to FIG. 1, the north thrusters 20, 22 and 2 4 have firing arcs at RA≈π/2 or 90° (where RA=right ascension which is the angle measured in the equatorial plane from a reference position of the sun at vernal equinox to the satellite position) and the south thrusters 26, 28 and 30 have firing arcs at RA≈3π/2 or 270°.

Figure 4A:
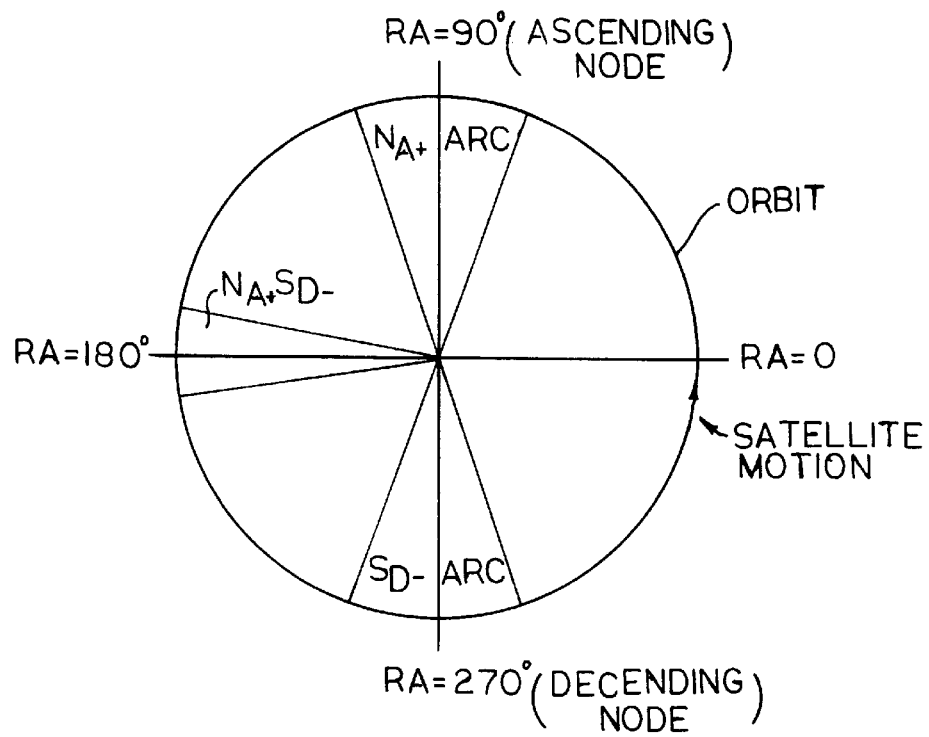
FIGS. 4A and 4B depict the burn arcs using each of the remaining diagonal pairs of the thrusters to achieve satellite station keeping in the event of a failure of one of the middle thruster/thruster pairs in the six thruster system of the present invention.

Referring now to FIG. 4A, there is shown the four burn strategy for station keeping for thruster 22,28 failure (Case 1) when the Sun RA is in the interval 90°≦Sun RA≦270°. For this ½ year, only thrusters 20 and 30 are fired. They are caused to fire at 90° and 270°, respectively, to provide control of the satellite 10 orbit inclination ($\bar{i}$) and, using gimbaling, for momentum dumping (MD). They are also fired simultaneously or in tandem at 180° to compensate for the satellite 10 drift rate ($\bar{d}$) and the orbit eccentricity ($\bar{e}$) thus providing East-West control.

Figure 4B:
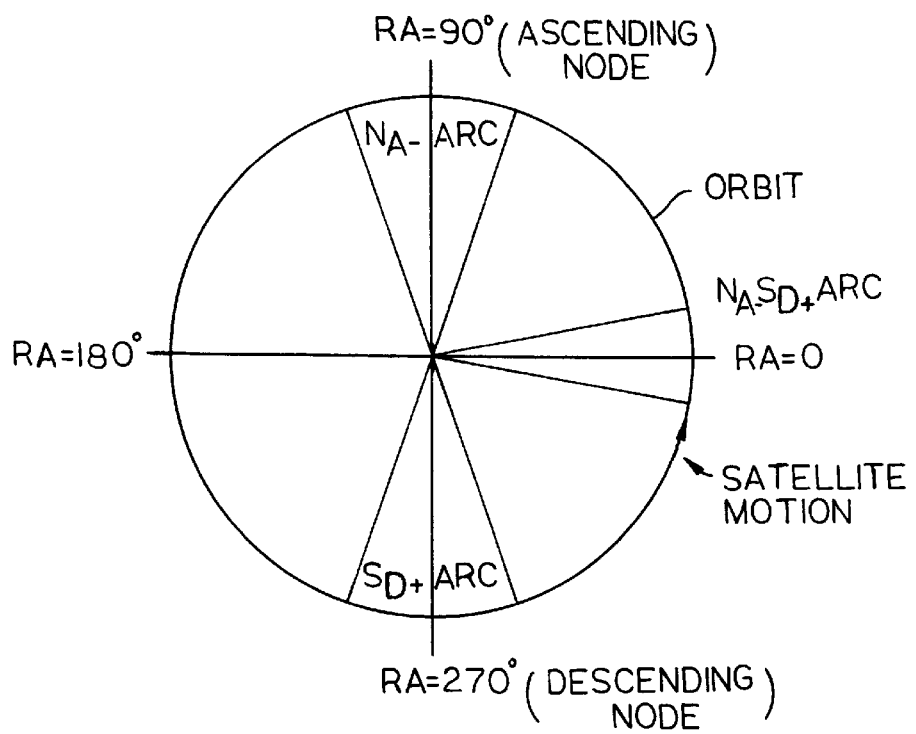

During the ½ year when RA is in the interval 270°≦Sun RA≦90°, only thrusters 24 and 26 are fired. This is shown in FIG. 4B. For this ½ year, thrusters 24 and 26 are used for station keeping; they are caused to fire at 90° and 270°, respectively, to provide control of the satellite 10 orbit inclination ($\bar{i}$) and for momentum dumping (MD, using gimbaling. They are also fired at approximately 0° to compensate for the satellite 10 drift rate ($\bar{d}$) and the orbit eccentricity ($\bar{e}$) thus providing East-West control.

One result of sharing the above-described burns by pairs alternating every six months results in not having to fire the thrusters during eclipse periods. In synchronous orbit these periods occur twice per year encompassing each equinox and each have a duration of approximately 45 days.

In a Case (2) failure, thrusters 22, 24, 26 and 28 remain in operation. In this case, thrusters 22, 28 provide only the inclination ($\bar{i}$) control and simultaneous momentum dumping (MD) using gimbaling. Thrusters 22 and 28 are fired at RA≈90° and RA≈270°, respectively. These burns are pre-selected to produce equal accelerations so that their ΔV radial components will cancel resulting in no net change in orbit eccentricity.

During a Case (2) failure, thrusters 24 and 26 are only used to control East-West parameters, i.e. drift rate ($\bar{d}$) and eccentricity ($\bar{e}$), and therefore fire through the CM of satellite 10. Most of the eccentricity removal is performed by the additive ΔV radial components of thrusters 24 and 26 which are simultaneously fired or fired in tandem, and the drift rate ($\bar{d}$) control is provided by the difference of their ΔV tangential components.

However, the orbit eccentricity ($\bar{e}$) to be removed is that produced solely by solar radiation forces as no coupling is generated by the thruster 22, 28 burns used for inclination ($\bar{i}$) control and momentum dumping (MD). As a result, the total acceleration required from the burns of thrusters 24 and 26 is reduced and the timing of the burns must be 180° away from the Sun RA. This results in firings being required during the two eclipse periods encompassing the spring and fall equinoxes. To circumvent this requirement, thrusters 24 and 26 firings must be separated by 180° from each other. Thus, during the spring equinox, thruster 24 fires at RA=90° and thruster 26 fires at RA=270°. Conversely, during the fall equinox, thruster 24 fires at RA=270° and thruster 26 fires at RA=90°. This is effective due to the additive and subtractive ΔV tangential components used to control the orbit eccentricity ($\bar{e}$) and drift rate ($\bar{d}$), respectively. Thus, the inclination ($\bar{i}$)coupling-produced by the above may be anticipated and countered by sizing the burns for thrusters 22 and 28 for control of orbit inclination ($\bar{i}$), resulting in no firings being necessary during the eclipse periods.

In a Case (3) failure, thrusters 20, 22, 28 and 30 remain operational. Thrusters 22,28 provide the orbit inclination ($\bar{i}$) control and simultaneous momentum dumping (MD) using gimbaling. The firings of thrusters 22,28 occur at RA≈90° and RA≈270°, respectively. Thruster burns are pre-selected to produce equal accelerations so that their ΔV radial components will cancel, resulting in no net change in orbit eccentricity ($\bar{e}$). Thrusters 20,30 are used to control the East-West drift rate ($\bar{d}$) and orbit eccentricity ($\bar{e}$) and have their thrust directed through the satellite 10 CM.

The majority of the orbit eccentricity ($\bar{e}$) removal is performed by the additive nature of the ΔV radial components of the thruster 20 and thruster 30 simultaneous (or tandem) firings. Drift rate ($\bar{d}$) control is accomplished by the difference of their ΔV tangential components.

However, the orbit eccentricity ($\bar{e}$) to be removed is that produced solely by the solar radiation force as no coupling is generated by the thruster 22,28 burns used for orbit inclination ($\bar{i}$) control and momentum dumping (MD). As a result the total acceleration required from the thruster 20,30 burns is reduced and the burn timing must be≈180° away form the Sun RA. This requires thruster 20,30 firings during the two eclipse periods encompassing the spring and fall equinoxes. To circumvent this requirement, thrusters 20 and 30 firings must be separated by 180° from each other. Thus, during the spring equinox, thruster 20 fires at RA=270° and thruster 30 fires at RA=90°. Conversely, during the fall equinox, thruster 20 fires at RA=90° and thruster 30 fires at RA=270°. This is effective due to the additive and subtractive ΔV tangential components used to control the orbit eccentricity ($\bar{e}$) and drift rate ($\bar{d}$) respectively. Thus, the inclination ($\bar{i}$) coupling produced by the above may be anticipated and countered by sizing the thruster 22 and 28 burns for control of orbit inclination ($\bar{i}$), resulting in no firings being necessary during the eclipse periods.

The following Table I summarizes the station keeping operation for the nominal and three failure cases, wherein the orbit vectors are defined as follows:

$\bar{i}$=orbit inclination,
$\bar{d}$=orbit drift rate, and
$\bar{e}$=orbit eccentricity.

Also, the Momentum Dumping is abbreviated as "MD".

TABLE I

STATION KEEPING OPERATIONS

| Operation | Thruster/RA | Time-of Year |
|---|---|---|
| | Nominal | |
| $\bar{i},\bar{d},\bar{e}$ | 20,24/90°, 26,30/270° | All |
| MD | 22/90°, 28/270° | |
| | Thruster 22,28 Failure | |
| $\bar{i}$,MD | 24/90°, 26/270° | Winter/Spring |
| $\bar{d},\bar{e}$ | 24,26/0° | |
| $\bar{i}$,MD | 20/90°, 30/270° | Summer/Fall |
| $\bar{d},\bar{e}$ | 20,30/180° | |
| | Thruster 20,30 Failure | |
| $\bar{i}$,MD | 22/90°, 28/270° | All Except |
| $\bar{d},\bar{e}$ | 24,26/RA Sun + 180° | Eclipse Periods |
| $\bar{d},\bar{e}$ | 24/90°, 26/270° | Spring Eclipse |
| | 24/270°, 26/90° | Fall Eclipse |
| | Thruster 24,26 Failure | |
| $\bar{i}$,MD | 22/90°, 28/270° | All Except |
| $\bar{d},\bar{e}$ | 20,30/RA Sun + 180° | Eclipse Periods |
| $\bar{d},\bar{e}$ | 20/270°, 30/90° | Spring Eclipse |
| | 20/90°, 30/270° | Fall Eclipse |

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A station keeping system for a three-axis stabilized satellite, comprising:
    six thrusters mounted in two rows of three each on an anti-nadir face of the satellite, each of the thrusters having a line of thrust which passes through the center of mass (CM) of the satellite, the six thrusters including a northwest thruster, a north center thruster, a northeast thruster, a southwest thruster, a south center thruster, and a southeast thruster, the north thrusters being canted away from the anti-nadir face in a north direction with respect to a north-south axis which passes through the center of mass of the satellite, the south thrusters being canted away from the anti-nadir face in a south direction with respect to the north-south axis, the northeast and the southeast thrusters being slewed in an east direction about the north-south axis, the northwest and southwest thrusters being slewed in a west direction about the north-south axis, the north center and south center thrusters positioned in a plane defined by the north-south axis and a local vertical axis which passes through the center of mass of the satellite in a nadir direction;
    wherein firing the northwest and northeast thrusters near an orbit ascending node and the southwest and southeast thrusters near an orbit descending node in accordance with predetermined firing time durations produces normal, radial and tangential orthogonal $\Delta V$ acceleration components for on-orbit control of the satellite and firing of the north center thruster near an orbit ascending node and firing of the south center thruster near an orbit descending node produce normal and radial orthoginal $\Delta V$ components to provide momentum dumping and, in the event of failure, inclination control.

2. The system of claim 1 wherein said north and south thrusters are each gimbaled to permit moving the thrust line away from the center of mass of the satellite.

3. The system of claim 2 wherein each of said thruster is interrelated with an opposite thruster as a paired unit, said northwest and southeast thrusters forming a first pair of thrusters, the northeast and southwest thrusters forming a second pair of thrusters, and the north and south center thrusters forming a third pair of thrusters, wherein failure of one thruster in each of said pairs of thrusters disables the other thruster in each of said pairs of thrusters.

4. The system of claim 3 wherein the occurrence of a failure disabling said third pair of thrusters, initiates a predetermined firing sequence where the northeast thruster is fired at a Right Ascension (RA) of approximately 90° and the southwest thruster is fired at a RA of approximately 270° for controlling orbit inclination and dumping momentum and said same thrusters are fired at a RA of approximately 0° to compensate for orbit drift rate and eccentricity for a first period of six months; and
    where the northwest thruster is fired at a Right Ascension (RA) of approximately 90° and the southeast thruster is fired at a RA of approximately 270° for controlling orbit inclination and dumping momentum and said same thrusters are fired at a RA of approximately 180° to compensate for orbit drift rate and eccentricity for a second different period of six months.

5. The system of claim 3 wherein the occurrence of a failure disabling said first pair of thrusters, initiates a predetermined firing sequence where the north center thruster is fired at a Right Ascension (RA) of approximately 90° and the south center thruster is fired at a RA of approximately 270° for controlling orbit inclination and dumping momentum, and the northeast and southwest thrusters are fired at approximately a 180° offset from the RA of the sun to compensate for orbit drift rate and eccentricity for each 12 month period excluding spring and a fall equinox eclipses.

6. The system of claim 3 wherein the occurrence of a failure disabling said first pair of thrusters, initiates a predetermined firing sequence wherein:
    the north center thruster is fired at a Right Ascension (RA) of approximately 90° and the south center thruster is fired at a RA of approximately 270° for controlling orbit inclination and dumping momentum;
    the northeast thruster is fired at a RA of approximately 90° and the southwest thruster is fired at a RA of approximately 270° during the spring equinox eclipse to compensate for orbit drift rate and eccentricity; and
    the northeast thruster is fired at a RA of approximately 270° and the southwest thruster is fired at a RA of approximately 90° during the fall equinox eclipse to compensate for orbit drift rate and eccentricity.

7. The system of claim 3 wherein the occurrence of a failure disabling said second pair of thrusters, initiates a predetermined firing sequence where the north center thruster is fired at a Right Ascension (RA) of approximately 90° and the south center thruster is fired at a RA of approximately 270° for controlling orbit inclination and dumping momentum and the northwest and southeast thrusters are fired at approximately a 180° offset from the RA of the sun to compensate for orbit drift rate and eccentricity for each 12 month period excluding spring and a fall equinox eclipses.

8. The system of claim 3 wherein the occurrence of a failure disabling said first pair of thrustors, initiates a pre-determined firing sequence wherein:

the north center thruster is fired at a Right Ascension (RA) of approximately 90° and the south center thruster is fired at a RA of approximately 270° for controlling orbit inclination and dumping momentum;

the northeast thruster is fired at a RA of approximately 270° and the southwest thruster is fired at a RA of approximately 90° during the spring equinox eclipse to compensate for orbit drift rate and eccentricity; and the northeast thruster is fired at a RA of approximately 90° and the southwest thruster is fired at a RA of approximately 270° during the fall equinox eclipse to compensate for orbit drift rate and eccentricity.

9. A method of station keeping for a three-axis stabilized satellite having six thrusters situated in a north inline trio of thrusters and a south inline trio of thrusters mounted in a generally parallel configuration on the anti-nadir face of the satellite, each of the six thrusters gimbaled and having a line of thrust which passes through the center of mass (CM) of the satellite, each of the thrusters in one trio being coupled with a thruster in the other trio, forming first, second and third thruster pairs whereby failure of one thruster in a pair inactivates the other thruster in said pair, comprising the steps of:

providing first, second, third and fourth pre-selected firing sequences, each associated with the occurrence of no thruster failure, a failure of a first pair thruster, a failure of a second pair thruster, and a failure of a third pair thruster, respectively, each firing sequence being mutually exclusive with respect to the others;

maintaining the first pre-selected thruster firing sequence with all thrusters operating normally for maintaining the satellite in a pre-determined orbit;

initiating the second pre-selected thruster firing sequence upon the failure of a thruster associated with the first thruster pair and inactivating that pair to maintain the satellite in the pre-determined orbit;

initiating the third pre-selected thruster firing sequence upon the failure of a thruster associated with the second thruster pair, and inactivating that pair to maintain the satellite in the pre-determined orbit; and initiating a fourth pre-selected thruster firing sequence upon the failure of a thruster associated with the third thruster pair and inactivating that pair to maintain the satellite in the pre-determined orbit.

\* \* \* \* \*